United States Patent [19]
Acres

[11] 3,893,341
[45] July 8, 1975

[54] MEASURING DEVICES

[75] Inventor: Alan Birt Acres, Leigh-on-Sea, England

[73] Assignee: Electrothermal Engineering Limited, London, England

[22] Filed: Jan. 5, 1973

[21] Appl. No.: 321,119

[30] Foreign Application Priority Data
Jan. 6, 1972 United Kingdom............... 682/72

[52] U.S. Cl................................ 73/362 AR; 73/17 R
[51] Int. Cl. .............................................. G01k 7/20
[58] Field of Search ..................... 73/362 AR, 17 R

[56] References Cited
UNITED STATES PATENTS

| | | | |
|---|---|---|---|
| 3,052,124 | 9/1962 | Averitt | 73/362 AR |
| 3,117,448 | 1/1964 | Gilmont et al. | 73/362 AR |
| 3,289,460 | 12/1966 | Anderson | 73/17 R |
| 3,541,857 | 11/1970 | Massey | 73/362 AR |
| 3,570,313 | 3/1971 | Frank et al. | 73/362 AR |
| 3,575,053 | 4/1971 | Telinde | 73/362 AR |
| 3,611,806 | 10/1971 | Hishikari | 73/355 R |
| 3,667,280 | 6/1972 | Simpson | 73/17 R |
| 3,688,581 | 9/1972 | LeQuernec | 73/362 AR |
| 3,695,112 | 10/1972 | Possell | 73/362 AR |
| 3,731,535 | 5/1973 | Wendt | 73/342 |
| 3,738,174 | 6/1973 | Waldron | 73/362 AR |
| 3,754,442 | 8/1973 | Arnett | 73/362 AR |

*Primary Examiner*—Richard C. Queisser
*Assistant Examiner*—Frederick Shoon
*Attorney, Agent, or Firm*—Stevens, Davis, Miller & Mosher

[57] ABSTRACT

A device for measuring a physical condition such as temperature comprises a negative feedback amplifier and two resistance components both subjected to the same physical condition to be measured. One component is supplied with current from a constant current source and supplies an input signal to the amplifier while the other linearises the output of the amplifier with respect to the physical condition by varying the amount of negative feedback. The measured physical condition can then be indicated by a linear voltmeter such as a digital voltmeter.

10 Claims, 3 Drawing Figures

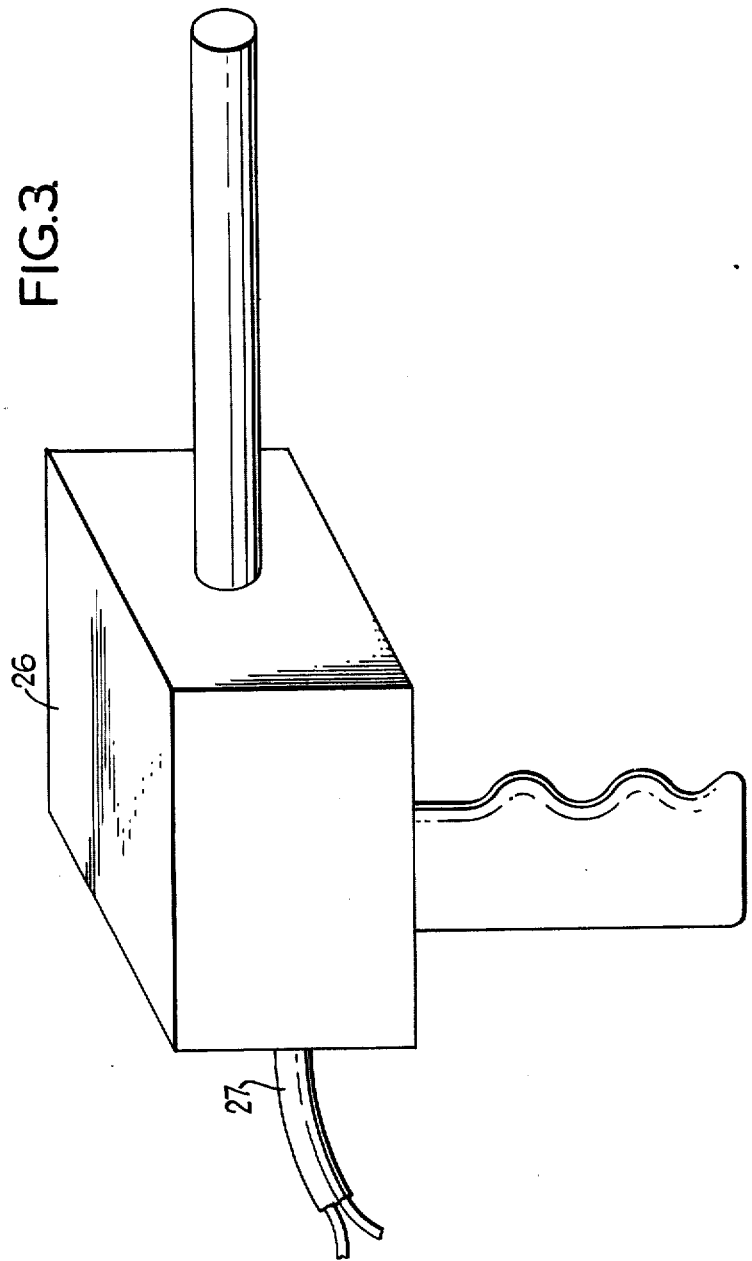

MEASURING DEVICES

SUMMARY OF THE INVENTION

The present invention relates to measuring devices.

A device for measuring some physical condition such as temperature may comprise an electrical component i.e. a sensor or transducer, which is made to produce an electrical signal varying according to the physical condition, the electrical signal then being amplified in an amplifier. The electrical signal, however, will rarely vary linearly with respect to the physical condition and this is a substantial disadvantage where the output of the amplifier is to be displayed by means, such as a digital voltmeter, in which it is difficult, impossible or simply undesirable, to so arrange the display that the non-linearities are compensated for. Accordingly, it is an object of this invention to provide an amplifier output signal which varies substantially linearly with variations in a physical condition to which is subjected an electrical component producing the input signal for the amplifier.

According to the invention there is provided a measuring device comprising an amplifier, a negative feedback path between its output and its input, a first electrical component for being subjected to a physical condition to be measured and arranged in said feedback path for varying the amount of feedback supplied by said feedback path in accordance with said physical condition, and a second electrical component for being subjected to said physical condition and connected to the input of said amplifier for supplying thereto an electrical input signal indicative of said physical condition, whereby the output of said amplifier varies substantially linearly with variations in said physical condition.

The curves obtained by plotting the functions relating the physical condition to be measured to the respective characteristics of the two components should have substantially the same shape or should be able to be made to have substantially the same shape by expanding, contracting and/or inverting the ordinate of one of them. In other words, one of the two variable characteristics should always be the same multiple of the other for any particular value of the physical condition to be measured.

The measuring device may be used to measure temperature in which case the two components may both be platinum resistors. The platinum resistor which is arranged to supply an electrical signal to the input of the amplifier may have one terminal connected to a supply of unidirectional electrical energy and the other terminal connected to a bias voltage or reference point so that the voltage appearing at said one terminal varies with the resistance of the platinum resistor and consequently with the temperature of the platinum. The input terminal of the amplifier is then connected to said one terminal. Preferably, the supply of energy comprises a constant current source, using for example a field-effect transistor, so that the proportionality constant of the function relating the resistance of the platinum resistor and the input signal supplied to the amplifier is unity, i.e. so that the input signal doubles when the resistance doubles and so on.

The platinum resistor which varies the amount of feed-back supplied by the negative feedback path can be itself a part of the negative feedback path by being one of a series/parallel network of resistors connected between the input and the output of the amplifier. The amplifier may be an integrated-circuit operational amplifier, a suitable one being that known by the manufacturer's reference SN72307, such amplifiers being generally provided with an "inverting input" and a "non-inverting input". When an amplifier having two such inputs is used, then the amplifier input signal can be supplied to the non-inverting input while the feedback path may be connected to the inverting input.

A function of the measuring device according to the invention is to supply a linearized and rationalised signal to a voltmeter which is not, or cannot be, specially calibrated to take account of any non-linearities in the function relating the physical condition to be measured and the measuring signal supplied by components which are available to measure that physical condition. For example, the voltmeter may be of the digital kind and it would be difficult to calibrate such a voltmeter to take account of the non-linear temperature/resistance function of a platinum resistance thermometer. Rationalisation means the adjustment in magnitude of a signal so that the voltmeter reading represents a convenient measure of the physical condition to be measured, for example, with a voltmeter calibrated in units of say 1 millivolt, then one millivolt of signal supplied to the meter can be made to represent say 1° C of temperature. The measuring device according to the invention can be made up as a probe having terminals for connection to a digital voltmeter and the owner of a digital voltmeter can have several such probes, each programmed to measure a different physical condition, and he can then use anyone of the probes to measure a desired one of those physical conditions. The measuring device could also form a permanent part of apparatus such as melting point determination apparatus in which a sample of material whose melting point is to be determined is placed in a capillary tube contained in a metal block or sample holder. The metal block is then heated and its temperature is displayed. When the sample of material starts to melt, which can be seen for example when granules of the material start to slide down the inner walls of the capillary tube, the displayed temperature is read off. The sample of material in the tube can, in such apparatus, be viewed through windows in the metal block or an image of the tube and sample can be projected, by using an optical system comprising lenses and mirrors or prisms, and a projection lamp, onto a screen. The measuring device is used to measure the temperature of the sample holder and to supply a linearised and rationalised measuring signal to a digital voltmeter which displays the temperature of the sample holder. In apparatus, such as the melting point determineation apparatus described above, there are preferably provided calibration controls for use when setting up the apparatus. For example, there may be switches for cutting out the components which supply signals representing the physical condition to be measured and cutting in accurate and close tolerance components which supply such signals that the display device, for example a digital voltmeter, ought to give a particular reading such as zero. Adjustable components in the apparatus are then set to give that reading.

DESCRIPTION OF THE DRAWINGS

In the accompanying drawings:

FIG. 3 is a diagram of a probe incorporating the measuring device according to the invention.

DETAILED DESCRIPTION

Figure 1:
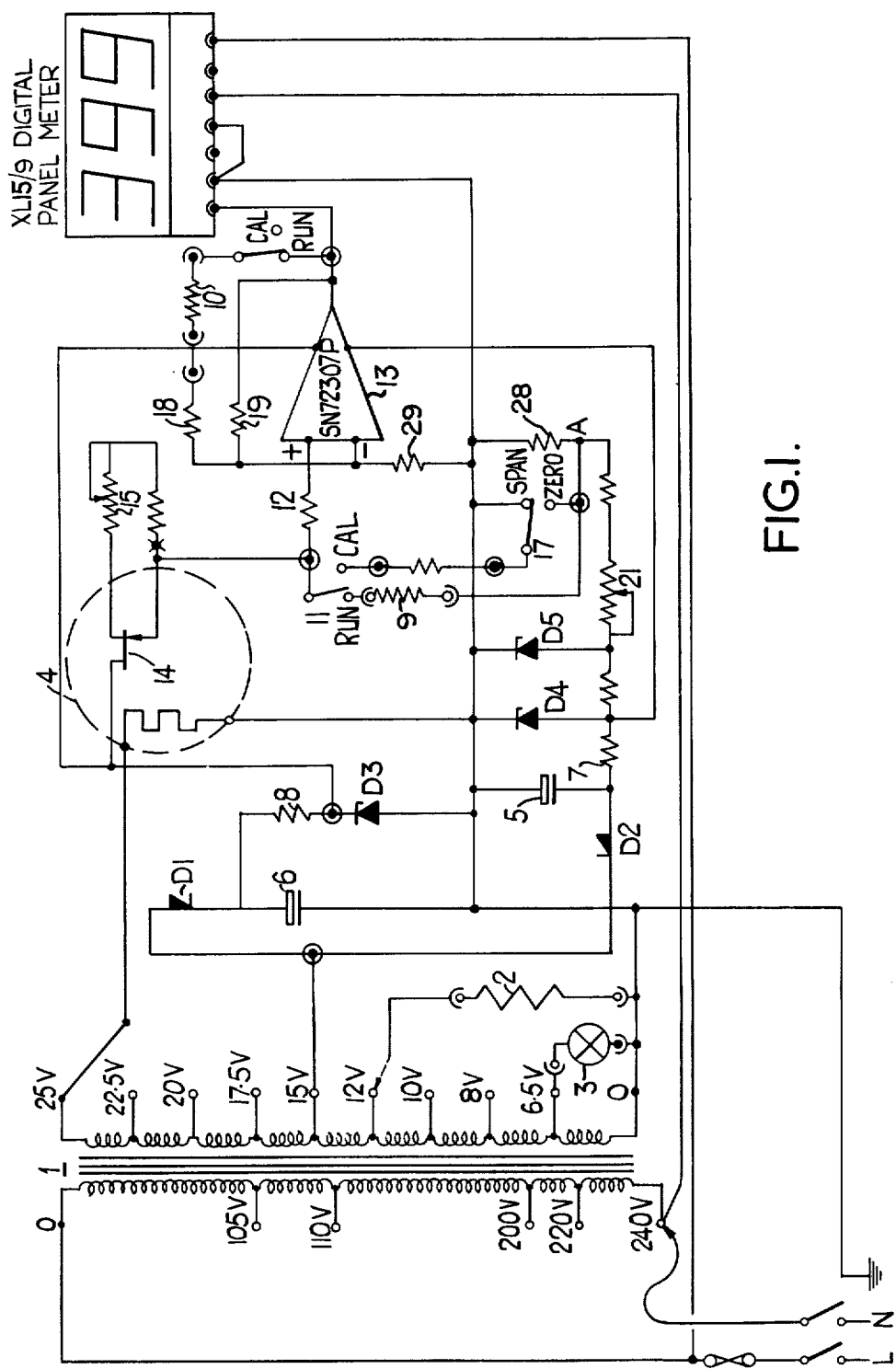
FIG. 1 is a circuit diagram of the electrical parts of melting point determination apparatus.

Referring to FIG. 1, the melting point determination apparatus contains a tapped mains transformer 1 which receives a mains electrical supply via terminals N and L. Connected to the secondary winding of the transformer there is a heater 2, for heating the sample holder in the apparatus, and a projection lamp 3 for projecting an image of the capillary tube contained in the sample holder onto a screen via a lens and mirror or prism system. Also connected to the secondary winding of the transformer there is a circuit comprising the diodes D1, D2, D3 and D4, the capacitors 5 and 6, and the resistors 7 and 8, which supplies a smoothed d.c. supply to the electronic part of the circuit. Situated inside the sample holder there are two platinum resistor components 9 and 10 whose resistances vary with the temperature of the sample holder. The two platinum resistors are of similar shape and size so that the two curves obtained by plotting the functions relating the temperature to the respective resistances of the two platinum resistors have substantially the same shape. One terminal of the resistor 9 is connected to a reference voltage point A and the other terminal is connected via one set of contacts of a switch 11 and a resistor 12 to the non-inverting input of a Texas Instruments SN72307P integrated-circuit, operational amplifier 13. Connected between the resistor 12 and the switch 11 there is a lead from a constant-current source comprising a field-effect transistor 14 and biassing resistors one of which 15 is variable. The field effect transistor is of the type No. 2N3823 and it is enclosed in a component oven 4 (Texas Instruments type No. 5STI-2) which maintains its temperature substantially at 90°C. When the switch 11 in its normal "RUN" position as shown, a voltage is developed across the platinum resistor 9 which voltage is dependent upon the resistance of the resistor 9, the proportionality constant of the function being unity. With the switch 11 in its other position "CAL" the constant current is supplied to an accurate close tolerance resistor 16 whose other terminal is connected to a switch 17, which may be a push-button switch. Connected between the output and the inverting input of the amplifier 13 there is a feedback network comprising two resistors 18 and 19 and the platinum resistor 10. The platinum resistor 10 is connected in series with the resistor 18 and this series combination is connected to the inverting input of the amplifier and to the output of the amplifier via a further set of contacts of the switch 11. The resistor 19 is connected in parallel with the resistors 18 and 10 and the further set of contacts. The output of the amplifier 13 is connected as a signal input to a digital voltmeter 20 which also receives a mains power supply from the terminals N and L. The voltage at the reference point A is derived from a bias chain which includes a variable resistor 21 and a fixed resistor 28. The function of this bias voltage is to cancel out the voltage across the platinum resistor 9 at 0° Centigrade which appears because the resistor 9 has a finite resistance at this temperature. The reference point A is at one side of the resistor 28 and the other side of the resistor 28 is connected to the inverting input of the amplifier 13 via a fixed resistor 29. To set up the apparatus, the switch 11 is put into the CAL position in which position the constant current is fed through the resistor 16, the switch 17 is put into a "set zero" position and the adjustable resistor 21 is adjusted until the digital voltmeter gives a reading of zero. The switch 17 is then reset to the "SPAN" position and the variable resistor 15 is adjusted until the digital volt-meter gives a predetermined reading which depends on the value of the resistor 16. The switch 11 is then returned to its RUN position.

The values of the resistances in the described melting point determination apparatus are chosen so that the digital voltmeter receives a voltage signal of one millivolt for every 1°C change of temperature of the platinum resistors.

Figure 2:
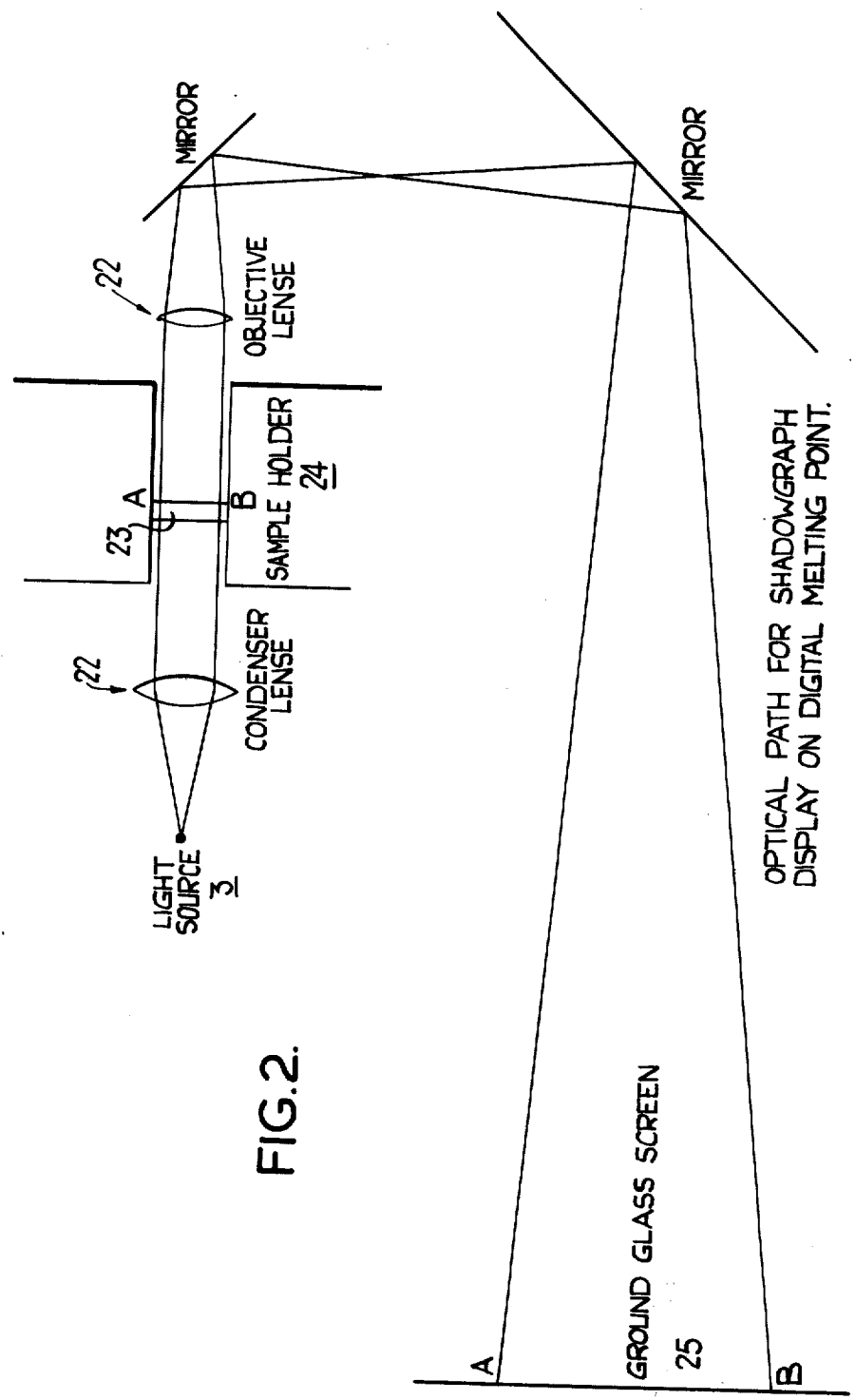
FIG. 2 is a diagram of a projection system for displaying an image of a sample of material whose melting point is to be determined.

FIG. 2 shows the projection system comprising the projection lamp 3 and a lens system 22 for projecting an image of a sample 23 the melting point of which is to be determined and which is contained in a sample holder 24 comprising a metal block onto a screen 25.

FIG. 3 shows a housing 26 in the form of a portable probe, the housing containing the amplifier and electrical components comprised in the measuring device and there being a cable 27 leading into the housing for supplying electrical power to the measuring device and for transmitting the output signal from the amplifier of the measuring device to a digital voltmeter. The power for the measuring device is obtained from the digital voltmeter.

Instead of being used for temperature measurement, a measuring device according to the invention can be used for measuring other physical conditions by using appropriate resistance sensing components, for example wire resistance strain gauges, and the like.

I claim:

1. Melting point determination apparatus comprising a heatable sample holder for supporting and heating a sample of material whose melting point is to be determined, first and second similar metallic temperature dependent resistances positioned so that their temperature remains close to that of said sample holder, an amplifier having a negative feedback path between its output and its input, said first resistance being arranged in said feedback path for varying the gain of said amplifier by varying the amount of feedback supplied by said feedback path in accordance with said temperature, a constant current source connected to said second resistance for supplying current which passes through the second resistance to form across the terminals thereof a voltage signal whose value depends on said temperature, the input of the amplifier being connected to the second resistance for amplifying said voltage signal to form an output signal which varies substantially linearly with variations in said temperature, and means, connected to the amplifier output, for indicating said temperature, the apparatus further including a projection lamp and a lens system for projecting an observable image of said sample, when the latter is present, onto a screen.

2. A device according to claim 1, wherein said resistances are made of platinum.

3. A device according to claim 1, wherein said constant current source comprises a field effect transistor and means for ensuring that said field effect transistor is kept at a substantially constant temperature.

4. A measuring device according to claim 1, wherein said feedback path comprises a series/parallel network of resistors connected between the output and input of said amplifier, and said first component is one of said resistors.

5. A measuring device according to claim 1, wherein said amplifier is an integrated-circuit operational amplifier.

6. A measuring device according to claim 1, wherein said amplifier has an inverting input and a non-inverting input, said feedback path being connected between the amplifier output and the inverting input, and said input signal being supplied to the non-inverting input.

7. A device according to claim 1, further including a digital voltmeter connected to receive the output of said amplifier for indicating the measured physical condition.

8. A measuring device according to claim 1, further including a housing for the device in the form of a portable probe, and an electrical cable leading from said housing for supplying electrical power to the device and for transmitting the output signal from said amplifier to a voltmeter.

9. A measuring device comprising an amplifier, a negative feedback path between its output and its input, a first metallic temperature dependent resistance for being subjected to an ambient temperature to be measured for its resistance value to depend on said ambient temperature and arranged in said feedback path for varying the amount of feedback supplied by said feedback path in accordance with said physical condition, a constant current source, a reference voltage point, and a second metallic temperature dependent resistance for being subjected to said ambient temperature for its resistance value to depend on said ambient temperature, the second resistance having one terminal connected to said constant current source and to the input of the amplifier and its other terminal connected to said reference voltage point, for supplying to the input of the amplifier an electrical input signal indicative of said ambient temperature, whereby the output of said amplifier varies substantially linearly with variations in said ambient temperature.

10. Melting point determination apparatus comprising:

a. a heatable sample holder for supporting and heating a sample of material whose melting point is to be determined;

b. first and second similar metallic temperature dependent resistances positioned so that their temperature remains close to that of said sample holder;

c. an amplifier having a negative feedback path between its output and its input;

said first resistance being arranged in said negative feedback path for varying the gain of said amplifier by varying the amount of feedback supplied by said feedback path in accordance with said temperature;

d. a constant current source connected to said second resistance for supplying a constant current which passes through the second resistance to form across the terminals thereof a voltage component having a magnitude equal to the product of the magnitude of said constant current and the resistance value of the second resistance;

e. reference voltage forming means for forming a reference voltage component having a magnitude equal to the product of the magnitude of the said constant current and the resistance value of said second resistance when said temperature has a value at which the amplifier output signal is required to be zero;

the amplifier input being connected to said second resistance and to said reference voltage forming means to receive an input voltage signal equal to the difference between the two voltage components and to amplify said input voltage signal to form an output signal which varies substantially linearly with variations in said temperature and which is zero at said temperature value at which the amplifier output signal is required to be zero, f. a digital voltmeter, connected to the amplifier output, for indicating said temperature; and g. a projection lamp and a lens system for projecting an observable image of said sample, when the latter is present, onto a screen.

* * * * *